(12) United States Patent
Hagberg et al.

(10) Patent No.: US 7,828,044 B2
(45) Date of Patent: Nov. 9, 2010

(54) CHARGE AIR COOLER

(75) Inventors: Magnus Hagberg, Södertälje (SE); Henrik Pettersson, Eskilstuna (SE)

(73) Assignee: Scania CV AB (SE)

( * ) Notice: Subject to any disclaimer, the term of this patent is extended or adjusted under 35 U.S.C. 154(b) by 590 days.

(21) Appl. No.: 11/722,485

(22) PCT Filed: Jan. 30, 2006

(86) PCT No.: PCT/SE2006/000127

§ 371 (c)(1),
(2), (4) Date: Aug. 28, 2007

(87) PCT Pub. No.: WO2006/088407

PCT Pub. Date: Aug. 24, 2006

(65) Prior Publication Data

US 2008/0155983 A1    Jul. 3, 2008

(30) Foreign Application Priority Data

Feb. 17, 2005    (SE) .................................. 0500371

(51) Int. Cl.
*F28F 27/02* (2006.01)
(52) U.S. Cl. .................... 165/96; 165/103; 165/174
(58) Field of Classification Search .......... 165/96, 165/103, 174
See application file for complete search history.

(56) References Cited

U.S. PATENT DOCUMENTS

| | | | | |
|---|---|---|---|---|
| 445,536 A | * | 2/1891 | Brockman | 165/96 |
| 1,912,670 A | * | 6/1933 | Trumble et al. | 165/96 |
| 2,143,565 A | * | 1/1939 | Minea | 165/174 |
| 2,261,596 A | * | 11/1941 | Stroobants | 165/96 |
| 2,319,698 A | * | 5/1943 | Mayne | 165/103 |
| 3,735,809 A | * | 5/1973 | Matsushima | 165/103 |
| 4,376,459 A | * | 3/1983 | Nagashima | 165/96 |
| 4,852,639 A | * | 8/1989 | Horiguchi et al. | 165/103 |
| 5,152,144 A | | 10/1992 | Andrie | |
| 5,968,312 A | * | 10/1999 | Sephton | 159/47.1 |
| 6,085,834 A | * | 7/2000 | Thomas et al. | 165/103 |
| 2004/0251012 A1 | * | 12/2004 | Bush et al. | 165/174 |

FOREIGN PATENT DOCUMENTS

| | | |
|---|---|---|
| GB | 1255956 | 12/1971 |
| JP | 6081664 | 3/1994 |
| WO | WO 2005033489 | 4/2005 |

OTHER PUBLICATIONS

Patent Abstract of Japan vol. 18, No. 338 (M-1628).
International Search Report PCT/SE2006/000127 dated Apr. 20, 2006.

* cited by examiner

*Primary Examiner*—Leonard R Leo
(74) *Attorney, Agent, or Firm*—Ostrolenk Faber LLP

(57) ABSTRACT

A charge air cooler comprising at least one tubular element with an internal flow duct for leading compressed air between an inlet aperture and an outlet aperture. A medium at a lower temperature than the compressed air is caused to flow in contact with an outside surface of the tubular element cooling the compressed air in the tubular element when the air is led through the flow duct. A movable control element is arranged close to the inlet aperture or the outlet aperture of the flow duct. A control for the control element provides a variable flow of compressed air through the flow duct as the movable control element is placed in various positions.

12 Claims, 2 Drawing Sheets

CHARGE AIR COOLER

CROSS REFERENCE TO RELATED APPLICATION

The present application is a 35 U.S.C. §§371 national phase conversion of PCT/SE2006/000127, filed 30 Jan. 2006, which claims priority of Swedish Application No. 0500371-0, filed 17 Feb. 2005. The PCT International Application was published in the English language.

BACKGROUND TO THE INVENTION, AND STATE OF THE ART

The present invention relates to a charge air cooler for a supercharged combustion engine, and particularly to control over the flow of air to be cooled through the air cooler.

The amount of air which can be supplied to a supercharged combustion engine of a vehicle depends on the pressure of the air but also on the temperature of the air. Supplying the largest possible amount of air to a supercharged combustion engine entails cooling compressed air in a charge air cooler before it is led to the combustion engine. The charge air cooler is usually situated in front of the conventional radiator of a vehicle. A charge air cooler usually comprises two tanks and a plurality of tubular elements arranged in parallel which connect the tanks to one another. The parallel tubular elements are arranged at a distance from one another so that surrounding cold air can flow between the tubular elements and cool the compressed air in the tubular elements. Depending on the efficiency of the charge air cooler, the compressed air can be cooled to a temperature more or less corresponding to the temperature of the surrounding air.

Charge air coolers in vehicles are usually so dimensioned as to be of relatively good efficiency. In certain circumstances when there is a cold ambient temperature and/or very high air humidity, the compressed air in a charge air cooler is cooled to a temperature below the dewpoint temperature of the air. Water vapour in the compressed air condenses, with the result that water in liquid form is precipitated in the charge air cooler. When the temperature of the surrounding air is very low, there is also risk that water in liquid form may freeze to become ice inside the charge air cooler. This may cause operational malfunctions if the cooler freezes up, resulting in a lack of air supply to the combustion engine. When a vehicle is started up from cold, it is also advantageous that the cooling of the compressed air led to the supercharged combustion engine should at first be reduced to enable the combustion engine initially to produce hotter exhaust gases which will warm up the vehicle's catalyst quicker. GB 1 255 956 refers to a charge air cooler for cooling compressed air before it is led to a combustion engine. The charge air cooler comprises a bypass line with an adjustable valve so that at least a desired portion of the compressed air can be led past the charge air cooler without being cooled. The uncooled portion and the cooled portion of the compressed air are thereafter mixed before being led to the combustion engine. Cooling a suitable portion of the compressed air makes it possible for the temperature of the air led to the combustion engine to be controlled to a desired value.

SUMMARY OF THE INVENTION

The object of the present invention is to provide a charge air cooler so constructed as to make it possible to control the flow of compressed air through the charge air cooler in a simple and reliable manner so that a combustion engine can substantially always be supplied with compressed air which is at an optimum temperature.

This object is achieved with the charge air cooler of the invention. Using at least one control element which can be set in various positions makes it possible to control effectively and accurately the flow of compressed air through the tubular element of the air cooler. The flow of compressed air is proportional to the air flow velocity through the charge air cooler. The smaller the flow passing through the charge air cooler, the lower the flow velocity of compressed air through the charge air cooler. When the flow velocity through the charge air cooler is low, the compressed air undergoes effective cooling. Adjusting the flow of compressed air through the tubular element thus makes it possible to alter the efficiency of the charge air cooler so that the compressed air can be cooled to a temperature which more or less approximates to the temperature of the cooling medium. The temperature of the compressed air after cooling in the charge air cooler is nevertheless largely determined by the temperature of the cooling medium. The temperature of the cooling medium itself varies considerably in cases where it takes the form of surrounding air. The control element according to the present invention can thus be used for very exact control of the flow of compressed air through the tubular element of the charge air cooler. It is therefore also possible to give the compressed air led to the combustion engine a substantially optimum temperature irrespective of the temperature of the surrounding air and the operating state of the combustion engine.

According to an embodiment of the present invention, the control element can be set steplessly in various positions between a first extreme position whereby a maximum flow of compressed air is led to the flow duct and a second extreme position whereby a minimum flow of compressed air is led to the flow duct. The flow of compressed air can thus be adjusted very exactly by moving the control element to a suitable position along a path which comprises said extreme positions. The compressed air led from the charge air cooler to the combustion engine can thus be given a desired temperature with very good precision.

According to another preferred embodiment of the present invention, the control element comprises a body with a controller in the form of at least one hole running through it which is adapted to being in such a position close to the inlet aperture or the outlet aperture of the tubular element that the hole and the inlet aperture or the outlet aperture together form a passage for compressed air, which passage has a flow-limiting cross-sectional area which is related to the position of the control element. With advantage, the hole corresponds in size and shape to the inlet aperture or the outlet aperture. When the control element is placed in a position in which such a hole and such an inlet aperture are fully in coaxial communication with one another, the result is an inlet passage with a substantially constant cross-sectional area. When the control element is in this position, a maximum flow of compressed air can pass through the inlet passage. If the control element is moved to a new position in a plane which is perpendicular to the main direction of flow through the inlet passage, the hole is subjected to a radial movement relative to the inlet aperture. In the new position of the control element, the hole and the inlet aperture will no longer be fully in coaxial communication with one another. When the control element is in such a position, the inlet passage has a reduced cross-sectional area in a transition region between the hole and the inlet aperture. The reduced cross-sectional area limits the flow through the inlet passage. The further the hole is moved in said plane away from the inlet aperture, the smaller will be the flow-limiting cross-sectional area in the transition region between the hole and the inlet aperture. If the control element is moved to a position where there is no longer any connection between the hole and the inlet aperture, the flow of compressed air through the inlet passage will also be interrupted.

According to a preferred embodiment of the present invention, the charge air cooler comprises a tank adapted to receiving compressed air before or after the latter has been cooled in the tubular element, whereby the control element is arranged inside said tank. Most conventional charge air coolers are provided with a warm tank on one side of the tubular element for accumulating warm compressed air before it is cooled, and a cold tank on the opposite side of the tubular element for accumulating the cooled compressed air. The control element may be in a protected location inside one of these tanks, close to the inlet aperture or the outlet aperture of the tubular element. The control element is with advantage platformlike and movable in a two-way rectilinear direction. Such a control element occupies a relatively small amount of space in the charge air cooler. It is also relatively easy to provide the control element with two-way mobility along a rectilinear path, but it is possible to arrange the control element so that it is provided with some other type of movement. The charge air cooler may comprise an actuator adapted to moving the control element to desired positions. As the inlet the hole and the inlet aperture are normally of relatively small dimensions, the control element need only be moved a relatively short distance by the actuator in order to alter the flow of compressed air through the inlet passage or the outlet passage. The actuator may be a proportional valve, e.g. in the form of a solenoid. It may also be an electrically, hydraulically or pneumatically powered actuator of another kind. With advantage, the charge air cooler comprises a control unit adapted to controlling the activation of the actuator in such a way as to move the control element to desired positions. The control unit may be a computer unit with suitable software for controlling the control element. To make functional control of the control element possible, the control unit may receive suitably operation-related information such as the temperature of the compressed air led to the combustion engine, the temperature of the surrounding air or other relevant information.

According to a preferred embodiment of the present invention, the charge air cooler comprises a plurality of tubular elements arranged in parallel, each of which is adapted to leading compressed air between an inlet aperture and an outlet aperture. Conventional charge air coolers usually comprise a relatively large number of parallel tubular elements arranged at a distance from one another so that a cooling air flow of surrounding air can flow between the tubular elements and cool the compressed air in the flow ducts inside the tubular elements. The control element may comprise a body provided with a plurality of holes running through it, each of which is adapted to being arranged in a position close to an inlet aperture or an outlet aperture of the tubular elements so that at least one passage with a flow-limiting cross-sectional area is formed in all the tubular elements. The flow through each of the tubular elements can thus be controlled substantially uniformly.

According to the present invention, the charge air cooler comprises a bypass line which extends parallel with the tubular element, and a valve means which can be set to allow a variable amount of compressed air to be led past the tubular element. Such a bypass line can lead a variable portion of compressed air directly between the tanks situated on mutually opposite sides of the tubular elements, without it being substantially cooled.

BRIEF DESCRIPTION OF THE DRAWINGS

An embodiment of the invention is described below by way of example with reference to the attached drawings, in which.

DETAILED DESCRIPTION OF AN EMBODIMENT OF THE INVENTION

Figure 1:
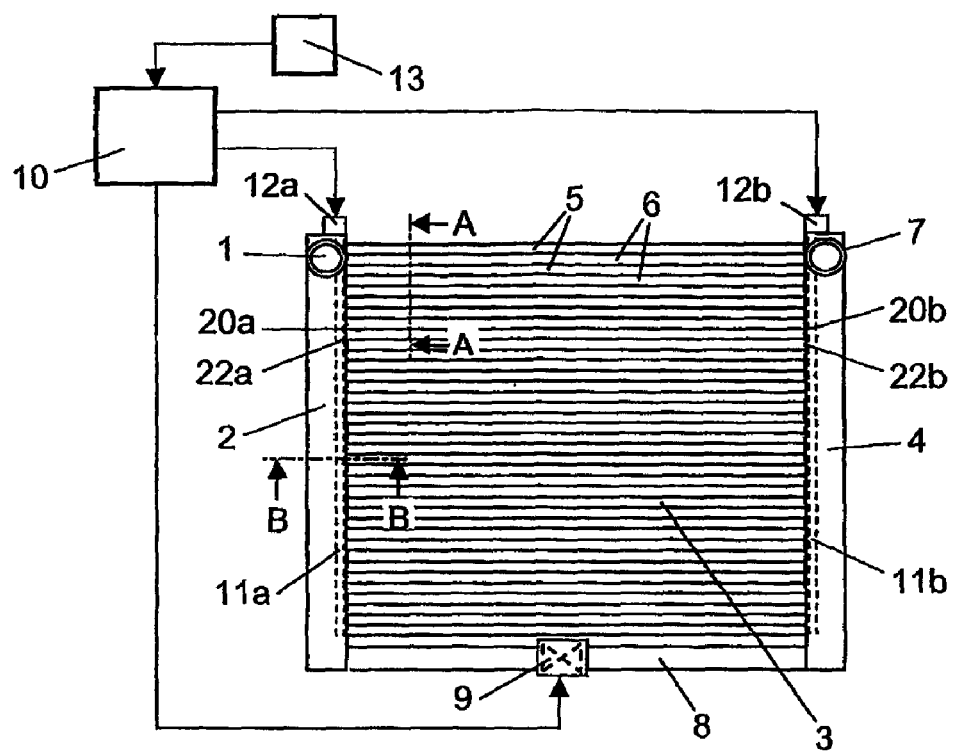
FIG. 1 depicts a charge air cooler according to the present invention.

FIG. 1 depicts a charge air cooler which may for example be fitted at a front portion of a vehicle which is powered by a supercharged combustion engine. A supercharged combustion engine needs a supply of compressed air. The function of the charge air cooler is to cool the compressed air before it is led to the combustion engine. The charge air cooler comprises an inlet 1 to a first tank 2 which receives warm compressed air from a compressor. The charge air cooler comprises a cooler package 3 which extends between the first tank 2 and a second tank 4 for receiving cooled compressed air. The cooler package 3 comprises a plurality of tubular elements 5 which extend in a substantially rectilinear manner in a common plane between the first tank 2 and the second tank 4.

The tubular elements are arranged parallel at a substantially uniform distance from one another so that there are regular gaps 6 between adjacent tubular elements 5. Surrounding air can therefore flow through the gaps 6 between the tubular elements 5. The flow of surrounding air through the cooler package 3 may be caused by the vehicle's movement and/or by a radiator fan which draws air through the cooler package 3. The surrounding air cools the compressed air which is led through the tubular elements 5. The second tank 4 thus receives the cooled compressed air from the respective tubular elements 5, after which the cooled compressed air is led out from the second tank 4 via an outlet 7. The cooled compressed air is thereafter led via suitable pipelines to an inlet pipe of the supercharged combustion engine. The charge air cooler comprises, at a lower portion, a bypass line 8 which extends between the first tank 2 and the second tank 4. When there is risk of excessive cooling of the compressed air in the charge air cooler, part of the compressed air can be led through the bypass line 8 instead of through the tubular elements 5. The bypass line 8 comprises a schematically depicted valve 9 via which a variable air flow can be led through the bypass line 8. The valve 9 is controlled by an electrical control unit 10.

The charge air cooler comprises a first control element 11a arranged in the first tank 2, and a second control element 11b arranged in the second tank 4, for controlling the flow of compressed air through the tubular elements 5. Each of the control elements 11a, b is movable between various positions inside the tanks 2, 4 by means of an actuator 12a, b. The actuators 12a, b may be proportional valves in the form of solenoids. The actuators 12a, b may also be electrical, hydraulic or pneumatic actuators of a known kind. The electrical control unit 10 is adapted to also controlling the activation of the actuators 12a, b so that they move the respective control elements 11a, b to desired positions. The control unit 10 controls the valve 9 and the actuators 12a, b on the basis of information from one or more sensors 13. One such sensor 13 may be a temperature sensor which detects the temperature of the compressed air after it has been cooled in the charge air cooler, or the temperature of the surrounding air. The control unit 10 may control the control elements 11a, b and the valve 9 on the basis of information about any desired number of relevant parameters so that compressed air with substantially optimum characteristics can always be led to the supercharged combustion engine.

Figure 2:
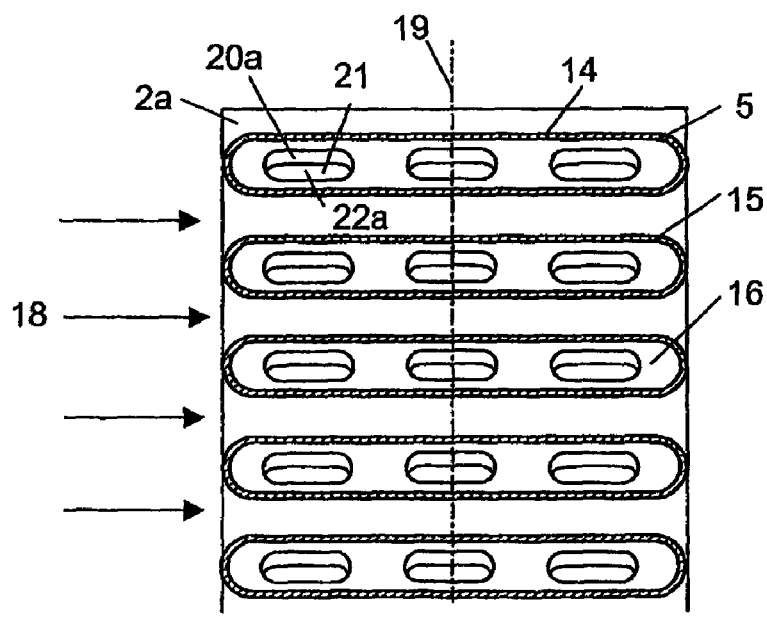
FIG. 2 depicts a section along the plane A-A in FIG. 1.

FIG. 2 depicts a section through a number of tubular elements 5 in the cooler package 3. The tubular elements 5 are of substantially identical construction. The tubular elements 5 are made of a material with high thermal conductivity, e.g. aluminium. The tubular elements 5 have an outside surface 14 which defines a contact surface with surrounding air. The tubular elements 5 have an inside surface 15 which defines a flow duct 16 for the compressed air inside the tubular elements 5. The compressed air passing through the flow ducts 16 in the respective tubular elements 5 is thus cooled by surrounding air. The surrounding air's main direction of flow 18 towards cooler package 3 is substantially perpendicular to a plane 19 which extends centrally through the mutually parallel tubular elements 5. The tubular elements 5 have in cross-section a substantially elongate profile in the main direction of flow 18 of the surrounding air in order to provide a large heat transfer surface between the flowing surrounding air and the tubular elements 5.

The first tank comprises a wall portion 2a which is provided with inlet apertures 20a leading compressed air to the flow ducts 16 in the respective tubular elements 5. In this case, the wall portion 2a comprises a row of three inlet apertures 20a, to each of the tubular elements 5. The control element 11a, which is thus arranged inside the first tank 2, is provided with a number of holes 21 running through it which corresponds to the number of inlet apertures 20a in the wall portion 2a. The holes 21 correspond in shape and size to the inlet apertures 20a. When the control element 11a is arranged in the tank 2, each of holes 21 forms together with an inlet aperture 20a an inlet passage 22a for the compressed air entering the tubular elements 5.

The second tank 4 comprises in a corresponding manner a wall portion with outlet apertures 20b for leading the compressed air out from the respective tubular elements 5. The control element 11b, which is arranged inside the second tank 4, is provided with a number of holes 21 running through it which corresponds to the number of outlet apertures 20b. The holes 21 correspond in form and size to the outlet apertures 20b. The function of the control element 11b in the second tank 4 corresponds to that of the control element 11a in the first tank 2. Holes 21 running through the control element 11b thus form together with the outlet apertures 20b an outlet passage 22b for the compressed air leaving the tubular elements 5.

Figure 3:
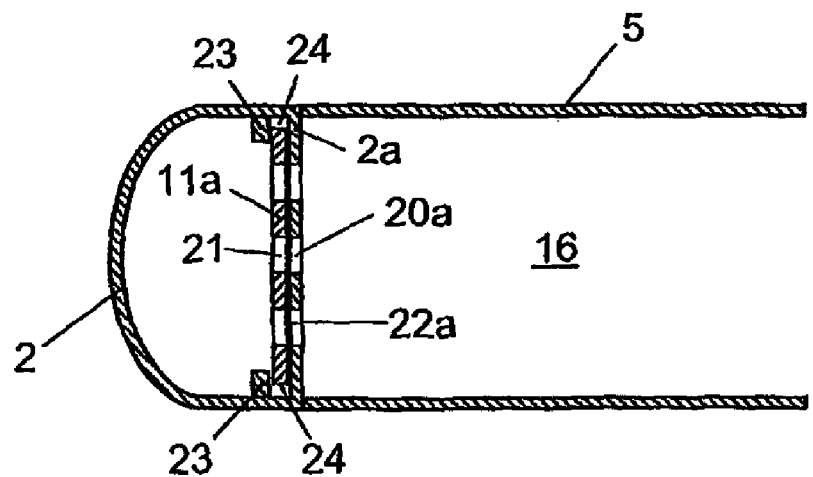
FIG. 3 depicts a section along the plane B-B in FIG. 1.
Figure 4:
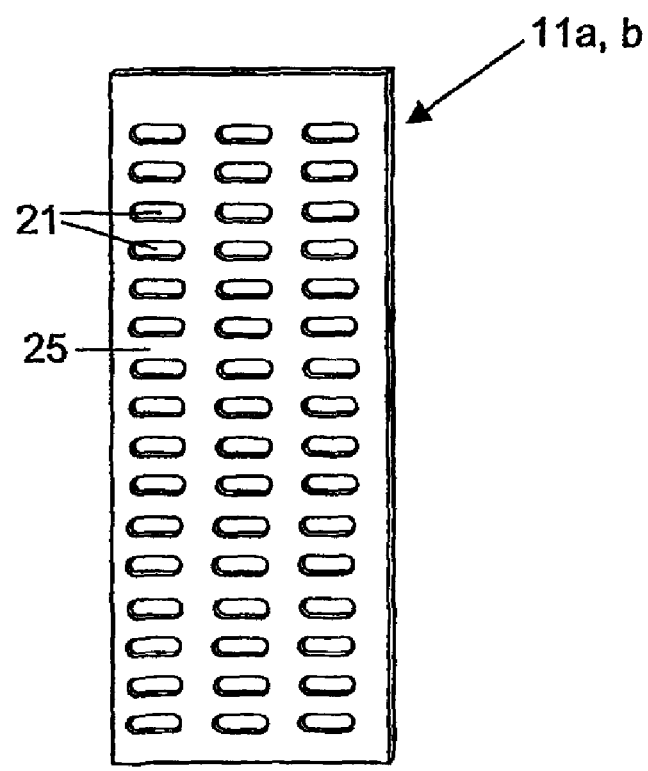
FIG. 4 depicts a control element according to the present invention.

FIG. 3 depicts a sectional view along the plane B-B in FIG. 1. The first tank 2 comprises portions 23 protruding inwards and arranged at mutually opposite ends of the wall portion 2a. Between the portions 23 protruding inwards and the wall portion 2a there are recesses 24 in which the control element 11a is arranged for linear movement. The second tank 4 may have a corresponding configuration for accommodating the control element 11b. If the inlet apertures 20a in the first tank 2 and the outlet apertures 20b in the second tank 4 correspond in shape and size, control elements 11a, b of substantially identical configuration can be arranged in the respective tanks 2, 4. Such a control element 11a, b is depicted separately in FIG. 4. The control element 11a, b comprises a platformlike substantially rectangular body which has a relatively large number of holes 21 running through it. The holes 21 have mutual positions corresponding to the mutual positions for the inlet apertures 20a of the first tank 2 and the outlet apertures 20b of the second tank 4.

During operation of the vehicle, the control unit 10 receives information from inter alia the sensor 13 about the temperature of the compressed air after it has left the charge air cooler. The control unit 10 uses inter alia such information to initiate positioning of the control elements 11a, b and the valve 9 so that a suitable flow of compressed air is led through the tubular elements 5 and the bypass line 8. Such control makes it possible for the compressed air in the second tank 4 to be given substantially a desired temperature with relatively great accuracy. Compressed air at a desired temperature can thus be led to the combustion engine during substantially all operating states of the combustion engine. In normal operation, the control elements 11a, b are controlled substantially synchronously so that the inlet passage 22a and the outlet passage 22b have a corresponding flow-limiting cross-sectional area.

In cases where the control unit 10 decides that a maximum flow of compressed air should be led through the tubular elements 5, the control elements 11a, b are placed in an extreme upper position. In this extreme upper position, all the holes 21 in the first control element 11a are in fully coaxial communication with the inlet apertures 20a of the first tank, and all the holes 21 in the second control element 11b are in fully coaxial communication with the outlet apertures 20b of the second tank 4. The result is a transition region between the holes 21 and the inlet apertures 20a which has a cross-sectional area corresponding to the cross-sectional areas of the inlet holes 21 and the inlet apertures 20a. There is a corresponding transition region between the holes 21 and the outlet apertures 20b which has a cross-sectional area corresponding to the cross-sectional areas of the inlet holes 21 and the inlet apertures 20a. When the respective control elements 11a, b are in the extreme upper position, a maximum flow of compressed air can be provided through the flow ducts 16 in the tubular elements 5.

If, on the contrary, the control unit 10 decides that the flow of compressed air through the tubular elements 5 needs reducing, the control elements 11a, b are moved slightly downwards in the recesses 24 to an appropriate position whereby the holes 21 of the control elements 11a, b are moved downwards relative to the inlet apertures 20a and the outlet apertures 20b. The holes 21 and the inlet apertures 20a and outlet apertures 20b respectively will thus no longer be in full coaxial communication with one another. In the transition region between the holes 21 and the inlet apertures 20a and outlet apertures 20b respectively, the cross-sectional area of the passages 22a, b will be reduced. The flow which can take place through said passages 22a, b is proportional to the smallest cross-sectional area of the passages. This position of the control elements 11a, b results in the formation of passages 22a, b which in said transition region have a reduced flow-limiting cross-sectional area. The further down the control elements 11a, b are moved, the further the holes 21 are moved away from the inlet apertures 20a and outlet apertures 20b respectively and the smaller will be the flow-limiting cross-sectional area in said passages 22a, b. The control elements 11a, b may be moved down to an extreme lower position whereby the holes 21 move completely past the inlet apertures 20a and outlet apertures 20b respectively so that there is no longer any communication via said passages 22a, b. When the control element is in the extreme lower position, there is therefore no flow of compressed air through the tubular elements 5. The distances 25 between adjacent holes 21 in the direction of movement of the control elements 11a,

*b* are greater than or equal to the extent in that direction of the respective holes 21, thereby ensuring that the flow through the passages 22*a, b* can be shut off completely.

When the flow of compressed air through the tubular elements 5 has to be increased during operation, the control unit 10 initiates an upward movement of the control elements 11*a, b*, and when the flow of compressed air through the tubular elements 5 has to be reduced, the control unit 10 initiates a downward movement of the control elements 11*a, b*. The control unit 10 initiates substantially simultaneously such positioning of the valve 9 that there is a desired flow through the bypass line 8. The control unit 10 may contain stored information concerning optimum mutual positions for the control elements 11*a, b* and the valve 9 for substantially all operating ranges of the combustion engine. In certain circumstances, the control unit 10 may initiate individual movement of the control elements 11*a, b* to different positions so that the inlet passages 22*a* and the outlet passages 22*b* have different flow-limiting cross-sectional areas. When there is risk of ice formation inside the charge air cooler, the control unit may use individual control of the actuators 12*a, b*, and hence of the flow-limiting cross-sectional areas of the passages 22*a, b*, to set up temporary pressure differences between the tanks 2 and 4. When such pressure differences are eliminated, intermittent flows of compressed air through the flow ducts 16 of the tubular elements 5 occur. Such intermittent air flows may blow the inside of the flow ducts 16 clean so that any ice formations are eliminated.

The invention is in no way limited to the embodiments described with respect to the drawings but may be varied freely within the scopes of the claims. In the embodiment described, control elements 11*a, b* are arranged in the two tanks 2, 4. The provision of a control element 11*a* in one of the tanks 2, 4 will usually be sufficient for controlling the flow through the tubular elements 5 in a desired manner. The control elements 11*a, b* may be of substantially any desired form with a suitable number of holes 21 of any desired shape or size. The tanks 2, 4 may also have substantially any desired number of inlet apertures 20*a* and outlet apertures 20*b* respectively which are appropriate in form and size. It is not necessary that the holes 21 and the inlet apertures 20*a* and the outlet apertures 20*b* respectively should fully correspond in shape and size. The cooling medium need not necessarily be surrounding air but may be a coolant circulated in a cooling system.

The invention claimed is:

1. A charge air cooler comprising:
at least one tubular element having inlet and outlet apertures and an internal flow duct therethrough for leading compressed air between the inlet aperture and the outlet aperture, and the tubular element having an outside surface shaped such that a medium at a lower temperature than the compressed air in the duct is caused to flow in contact with the outside surface of the tubular element, thereby subjecting compressed air in the tubular element to cooling as the compressed air passes through the flow duct,
respective first and second movable control elements having respective first and second control element bodies respectively arranged close to the inlet apertures and the outlet apertures of the tubular elements, the first and second moveable control elements configured and operable to adjust passage of air through the respective inlet aperture and outlet aperture;
a controller configured and operable for providing a variable flow of compressed air through the flow duct by independently operating the first and second movable control elements to be placed in various positions,
the first and second control element bodies each having at least one hole through the body, the hole is in a position close to the respective one of the inlet aperture and the outlet aperture of the tubular element so that the at least one hole in the body cooperates with the respective one of the inlet aperture and the outlet aperture to together form a passage for compressed air, the passage having a flow-limiting cross-sectional area which is related to the position of the control element body with respect to the respective one of the apertures.

2. A charge air cooler according to claim 1, wherein each of the said first and second control elements is configured and operable to steplessly vary its position with respect to the respective inlet aperture and outlet aperture between a first position permitting a maximum flow of compressed air to be led through the flow duct and a second position permitting a minimum flow of compressed air to be led through the flow duct.

3. A charge air cooler according to claim 1, further comprising a first tank located at the inlet apertures, the first tank being configured and operable for receiving the compressed air before the air has been cooled in the tubular element, and a second tank located at the outlet apertures, the second tank being configured and operable for receiving the compressed air that has been cooled in the tubular element, and each of the first and second control elements is arranged inside a respective one of the first and second tanks.

4. A charge air cooler according to claim 1, wherein each of the first and second control element bodies comprises a platform operable for a two-way movement along a rectilinear direction for adjusting the passage of compressed air through respective ones of the at least one apertures.

5. A charge air cooler according to claim 1, wherein the controller comprises respective first and second actuators configured and operable for moving the respective first and second control elements to the various positions.

6. A charge air cooler according to claim 5, wherein the controller further comprises a control unit operable for controlling the operation of the first and second actuators to move the first and second control elements to the various positions.

7. A charge air cooler according to claim 1, further comprising a plurality of the tubular elements arranged parallel and each tubular element has a respective inlet aperture and outlet aperture, and each tubular element is configured and operable for leading compressed air between its respective inlet aperture and outlet aperture.

8. A charge air cooler according to claim 7, wherein each of the first and second control element bodies has a plurality of holes through it, including a respective hole arranged in a position close to a respective one of the inlet apertures and the outlet apertures of the tubular elements for causing at least one passage with a respective flow-limiting cross-sectional area to be formed in each of the tubular elements.

9. A charge air cooler according to claim 1, further comprising a bypass line which extends in parallel with the tubular element, and a valve configured and operable to set a variable amount of the compressed air to be led past the tubular element via the bypass line.

10. A charge air cooler according to claim 9, wherein the valve is in the bypass line.

11. A charge air cooler according to claim 7, wherein each of the first and second control element bodies has a plurality of holes through the body, and the holes are arranged in respective positions close to respective one of the inlet apertures or the outlet apertures of the tubular elements for causing at least one passage with a flow-limiting cross-sectional area to be formed in each of the tubular elements.

12. A charge air cooler according to claim 11, further comprising a bypass line which extends in parallel with the tubular elements, and a valve configured and operable to set a variable amount of the compressed air to be led past the tubular elements via the bypass line.

* * * * *